Figure 1:
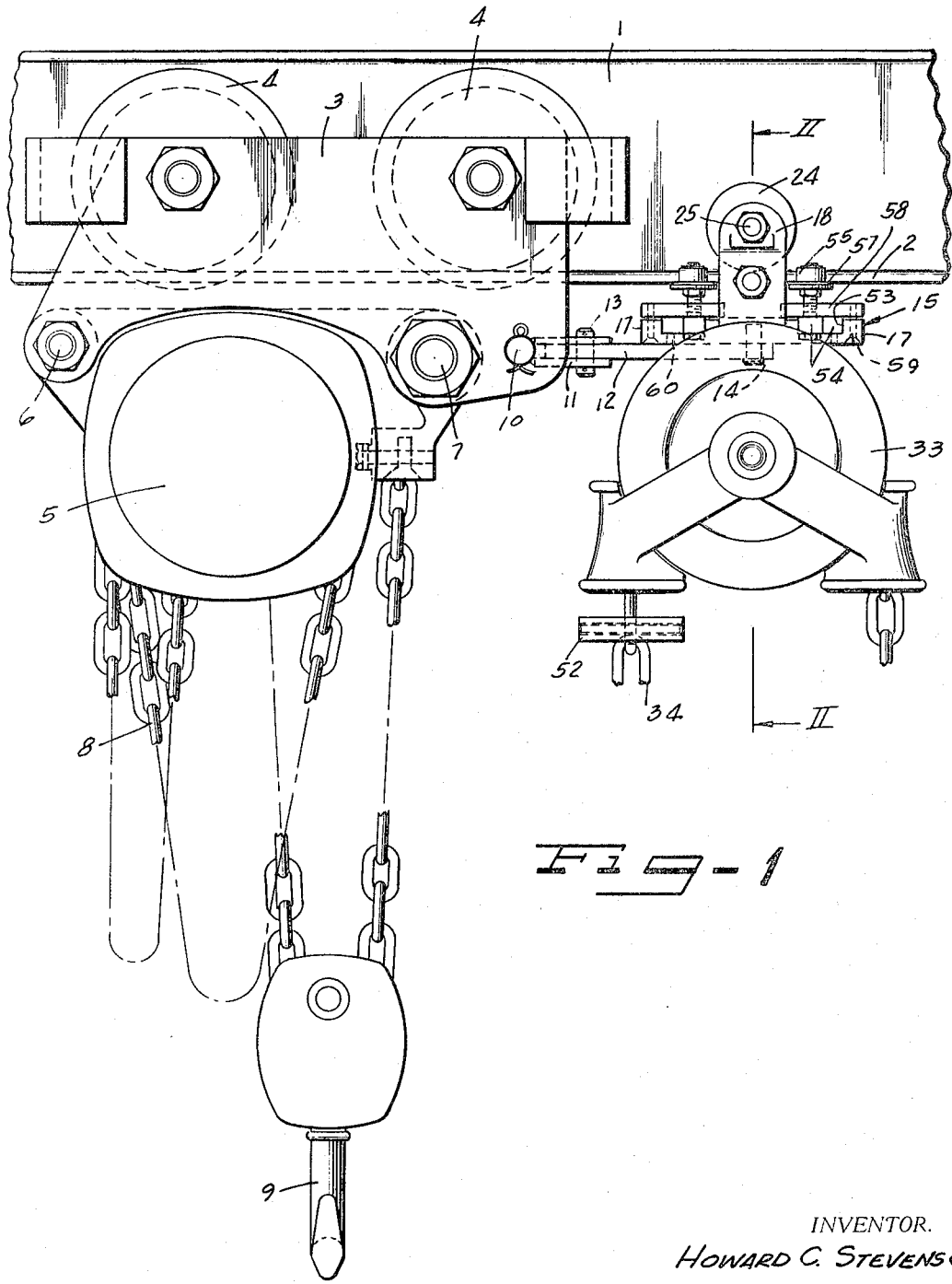

March 21, 1967     H. C. STEVENS, JR     3,310,134
SELF-LOCKING MONORAIL CLAMP
Filed Jan. 13, 1965     2 Sheets-Sheet 1

INVENTOR.
HOWARD C. STEVENS JR.

ATTORNEYS

United States Patent Office 3,310,134
Patented Mar. 21, 1967

3,310,134
SELF-LOCKING MONORAIL CLAMP
Howard C. Stevens, Jr., Muskegon, Mich., assignor to Dresser Industries, Inc., Dallas, Tex., a corporation of Delaware
Filed Jan. 13, 1965, Ser. No. 425,183
8 Claims. (Cl. 188—43)

This invention relates to improvements in a self-locking monorail clamp, highly desirable for use in connection with a trolley hoist or other apparatus movable along a track which usually comprises the lower flange of an I-beam, the clamp functioning to anchor the hoist or other apparatus in a desired position along the track and retain the same against movement for any desired period of time, the clamp automatically assuming locking position when the hand wheel and chain control therefor is released, although the invention may have other uses and purposes as will be apparent to one skilled in the art.

The instant invention is an improvement upon the track clamp set forth, described, and claimed in U.S. Letters Patent No. 3,017,958 issued January 23, 1962.

Difficulty has been experienced heretofore in the provision of a track clamp usable with a trolley hoist or other trolley apparatus where there was a curvature in the beam flange or rail of relatively small radius. Such curves are frequently encountered on shipboard, where loads must be moved through very confined areaways, including intersecting corridors, and the like, making extremely sharp turns essential.

Accordingly, one of the important objects of this invention is the provision of a track clamp that may be used with a trolley apparatus and successfully negotiate turns on rails or beam flanges, even sharp curves with a radius as low as 21 inches.

Also an important object of this invention is the provision of a track clamp so constructed as to allow increased opening of the clamp shoes relatively to the track, without excessive hand chain pull, whereby sharper turns may be negotiated than was heretofore possible.

Also a feature of this invention is the provision of a movable track clamp embodying guide and anti-tilt wheels arranged to compensate for differences in both width and thickness of the track such as the lower flange of an I-beam.

A further desideratum of this invention is the provision of a travelling track clamp having a draw link connection with a trolley apparatus such that the track clamp may shift out of alignment with the trolley apparatus both vertically and laterally, enabling smooth operation of both the clamp and trolley apparatus on straight-away courses or around gradual or sharp curves.

A further feature of this invention is the provision of a movable track clamp of the self-locking type, the clamp having spring means to automatically move clamp shoes into engagement with the track, and stop means to prevent excessive unlocking of the clamp so as to avoid possible injury to the spring means.

It is still another feature of this invention to provide a travelling track clamp controlled by a hand wheel and chain, and wherein added bending strength is provided for the hand wheel connection.

Figure 2:
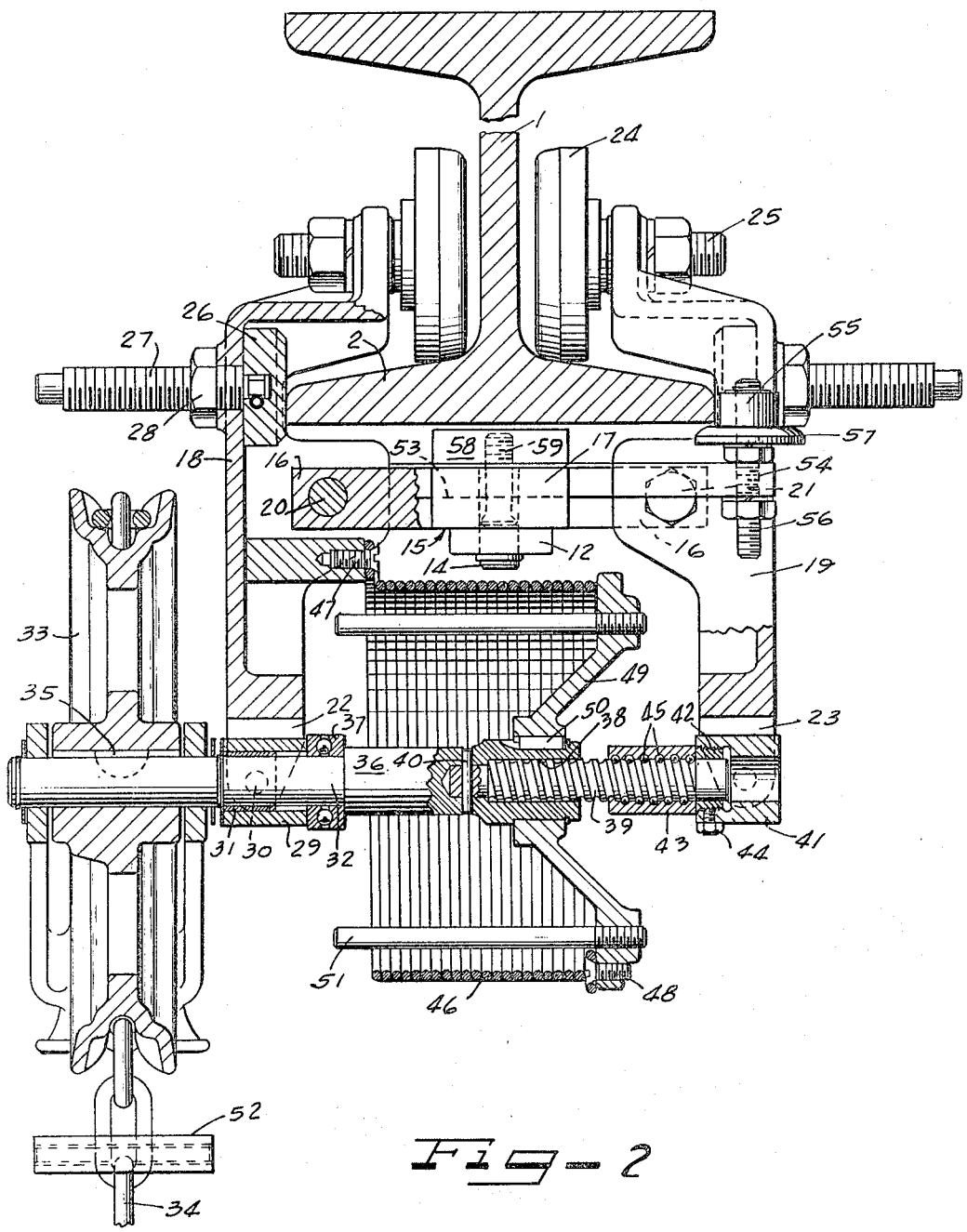

While some of the more salient features, characteristics and advantages of the instant invention have been above pointed out, others will become apparent from the following disclosures, taken in conjunction with the accompanying drawings, in which:

FIGURE 1 is a fragmentary side elevational view of a trolley apparatus in the form of a hoist on an overhead track, showing the same equipped with a track clamp embodying principles of this invention; and FIGURE 2 is an enlarged fragmentary, part sectional, part elevational view taken substantially as indicated by the line II—II of FIGURE 1, looking in the direction of the arrows.

As shown on the drawings:

The illustrated embodiment of the instant invention is shown associated with an integrated trolley hoist movable along an overhead track 1 which is in the form of an I-beam, the bottom flange 2 of the I-beam being the actual track for both the clamp and the hoist. The hoist is illustrated by way of example only, since it will be obvious to those skilled in the art that the clamp may be utilized with substantially any form of apparatus carried by a trolley and movable along a track such as the I-beam 1. The trolley comprises a pair of side plates 3, only one of which is shown in the drawings, disposed on opposite sides of the track and each side plate carries a pair of wheels 4—4, which ride the flange 2. A hoist frame or casing 5 is secured to the trolley by means of bolts 6 and 7, and contains any suitable hoisting mechanism with which is associated a lifting chain 8 carrying a load hook 9.

In this instance, the hoist trolley is provided with a horizontal pivot pin 10 journalled in the side plates 3 of the trolley. Welded or equivalently secured to the pivot pin 10 is a U-shaped connector 11 the legs of which extend outwardly away from the pivot pin. Between the legs of the connector 11 one end of a link 12 is disposed and held therebetween by means of a vertical pivot pin 13 on which the link 12 may pivot in a lateral plane. This link 12 establishes, in effect, a flexible connection between the hoist trolley and the track clamp. The other end of this link 12 is pivotal about the lower end of a stud 14 depending from the center portion of a horizontal plate generally indicated by numeral 15 and having the general shape of a Greek cross, to which plate the stud 14 is welded or equivalently secured. The plate 15, which is disposed horizontally, has opposed arms 16—16 disposed transversely to the track 2 and opposed arms 17—17 paralleling the track 2.

A pair of allochiral channel-shaped brake arms 18 and 19 are pivoted intermediately one to each of the transverse arms 16—16 of the plate 15 by a pivot pin or bolt as indicated at 20 and 21 respectively. As seen in FIGURE 2, each of the brake arms in effect embraces the respective arm 16. At the lower ends thereof the web portion has been removed from the arms 18 and 19 leaving extended bifurcated end portions as indicated at 22 and 23 respectively.

The arms 18 and 19 themselves are identical in construction, and at the upper end thereof each arm carries a wheel 24 journalled on a fixed stub shaft 25 in the end of the arm. The wheels are disposed on opposite sides of the web of the I-beam 1 and ride the lower flange 2 of the I-beam as seen clearly in FIGURE 2 by means of the stub shafts 25 the wheels may be spaced apart in accordance with the thickness of the I-beam web. Each arm also carries a clamp or brake shoe 26 mounted on the inner end of an adjustment screw 27 whereby the shoes may be properly spaced in accordance with the width of the I-beam flange, and held in adjusted position by means of a lock nut 28. Each shoe is rotatable on its respective shaft and may have a knurled or otherwise contoured face to firmly grip the side edge of the flange 2 by spring means to be later described.

Means for pivoting the clamp arms 18 and 19 to effect clamping of the track flange 2 by the shoes 26 or release the shoes, are connected with the lower ends of the clamp arms. These means include a trunnion block 29 held in position between the furcations 22 at the lower end of the clamp arm 18 by means of a stud 30 on each of the furcations extending into a suitable socket in the trunnion block. The trunnion block has a bearing 31 therein to accommodate a rotary shaft 32. The shaft 32 extends outwardly beyond the clamp arm 18, and a hand wheel 33 actuated in either direction by means of a hand chain 34 is keyed to the extended end portion of the shaft as indicated at 35. The inner part of the shaft is enlarged in diameter as indicated at 36 to provide a shoulder to bear against a thrust bearing 37. The inner end of the shaft is provided with a bore 38 to receive the end of a ball screw 39 and is locked to the shaft by means of a crosspin 40 extending through the shaft and the inner end of the ball screw. A trunnion block 41 is mounted between the furcations 23 of the other clamp arm 19 in the same manner as the trunnion block 29 is mounted. This trunnion block 41 is internally threaded to receive a threaded end portion 42 on a ball nut 43 as seen clearly in FIGURE 2. The ball nut is held tightly in the trunnion block by way of a set screw 44. The aforesaid ball screw 39 extends into the ball nut 43 and a plurality of balls 45 are located in the threads of the screw and the nut. Associating the ball screw with the end of the shaft farthest from the hand wheel permits a larger shaft diameter to resist the bending stresses caused by actuation of the hand wheel and relieves the ball screw of such bending stresses. It also results in the use of a shorter length of ball screw stock thereby materially reducing the cost of the entire clamp assembly.

In order to render the clamp assembly self-locking, a torsion spring 46 is provided, one end of the spring being secured to the clamp arm 18 by a screw 47, and the other end of the spring being secured by a screw 48 to a drive plate 49 keyed to the shaft 36 as shown at 50. The spring is prestressed and constantly urges the lower ends of the clamp arms 18 and 19 apart so that the clamp shoes 26 are forced against the side edges of the track 2. It is therefore necessary to maintain a manual hold on the hand chain 34 to keep the clamp assembly in unlocked position and while the clamp shoes 26 are free of the track 2 the operator must maintain a pull upon the hand chain. Immediately upon release of the hand chain, the spring acts to promptly lock the clamp to the track. A plurality of studs 51 secured in the drive plate 49 support the spring in the radial direction. Excessive unlocking of the clamp could cause damage to the spring 46, and therefore a stop 52 is provided on the hand chain 34 which prevents excessive unlocking movement and even though the chain is suddenly jerked with considerable pull thereon, the stop will prevent any damage to the spring 46.

Reaction to the clamping force is taken up by the thrust bearing 37, the ball screw 39, and the plate 15 to which the clamp arms 18 and 19 are pivoted.

Guiding and anti-tilt means are also provided in the clamp assembly. These means are carried by the arms 17—17 of the cross-shaped plate 15. Those arms parallel the track 2, and each arm is provided with a notch 53 therein. In each such notch 53 are a pair of like slide members 54, making a total of four such slide members disposed transversely to the track 2. On one end only of each slide member a guide wheel 55 is journalled on the upper end portion of an upstanding adjustment bolt 56 by means of which the height of the wheel may be varied. Each wheel also has a lateral flange 57 at the bottom thereof which extends beneath the track flange 2. The slide bars 54 are arranged alternately so that there are two wheels 55 on each side of the track flange 2.

In setting up the clamp assembly for a particular track, the slide bars 54 are moved inwardly until the wheels 55 just touch the vertical edge of the track flange 2. The slides are then secured in position by means of a locking plate 58 disposed over the pair of slides in each notch 53, this plate being secured by bolts 59, and the slides further held in place by set screws 60. The wheels 55 are next adjusted vertically by means of the adjustment screws 56 until the flange 57 on each wheel just clears the bottom of the rail, thereby providing anti-tilt means to hold the track clamp stable on the rail, counteracting the pull which the operator places upon the hand chain wheel 33.

The operation of the invention is simple, rapid, and positive. When it is desired to move the hoist along the track 2, the operator may pull upon the chain 34 and rotate the hand chain wheel 33 clockwise to draw the lower ends of the clamp arms 18 and 19 toward each other, thus releasing the clamp shoes 26 from contact with the track. The operator holds the hand chain, keeping the clamp in a released position until the desired location of the hoist has been reached, when the operator need merely let go of the hand chain and the spring 46 automatically resets the shoes 26 in track clamping position. The spring 46 is protected against injury should an overzealous operator attempt to spread the clamp shoes excessively by means of the stop member 52 which limits the amount of rotation the operator may give the shaft 32. The use of the anti-friction means, the ball nut and ball screw, increased the mechanical advantage several times the former value obtained by the use of a long standard screw with right and left hand nuts upon it, whereby sufficient spreading of the clamp shoes may be obtained to enable the clamp assembly to follow small radius track curves. Such spreading of the clamp shoes is obtained without excessive hand chain pull owing to the increased mechanical efficiency, whereas with the old standard screw and right and left nuts the clamp shoes could not be spread sufficiently far for the clamp assembly to negotiate any but extremely large radius track curves.

The instant trolley assembly will easily and properly go around a track curvature with a radius as low as 21 inches. Several factors in addition to the use of the anti-friction screw means contribute to this result. The flexible linkage between the hoist trolley and the clamp assembly with the draw link 12 pivotally connected to the bolt 13 and also pivotally connected to the bolt 14 on the plate 15 of the clamp assembly permits pivotal movement in a lateral plane at each end of this link, and the connector 11 pivoting in a vertical plane around the pin 10 in the hoist trolley eliminates the adverse effect of rail curvature and allows the lateral shifting of the clamp assembly out of alignment with the hoist trolley. Further, the guide wheels 55 hold the clamp in line with the rail and on a radius in line with a line through the center of the curve, and secondly prevent the clamp assembly from tilting. The lateral and vertical adjustment for these guide wheels permits the clamp assembly to be readily and properly mounted on any size track within a considerable range of track sizes.

The instant invention is not only highly efficient, self-clamping, capable of negotiating extremely sharp track curvatures, and easily mounted on various sizes of track, but is also economical to manufacture and use and has an extremely long trouble free life.

It will be understood that modifications and variations may be effected without departing from the scope of the novel concepts of the present invention.

I claim as my invention:
1. In a track clamp assembly,
   intermediate arm spacing means,
   a pair of confronting arms intermediately pivoted to said means at opposed points,
   a track riding wheel at one end of each arm, a clamp shoe on each arm between the respective said wheel and the pivot point, a non-threaded control shaft rotatable in the other end of one of said arms, a thrust bearing interposed between said control shaft and said one of said arms, anti-friction camming means connecting to the other end of the other arm and engaged with said shaft to pivot the arms by reacting against said thrust bearing when the shaft is rotated, and actuating means connected adjacent said one of said arms to rotate said shaft.

2. In a track clamp assembly, intermediate arm spacing means, a pair of confronting arms intermediately pivoted to said means at opposed points, a track riding wheel at one end of each arm, a clamp shoe on each arm between the respective said wheel and the pivot point, a control shaft rotatable in the other end of one of said arms, a ball nut carried by the other end of the other of said arms, a ball screw operatively connected with said nut and locked to an end of said shaft for rotation therewith, and actuating means to rotate said shaft to pivot said arms and move said other ends of the arms toward or away from each other.

3. In a track clamp assembly, intermediate arm spacing means, a pair of confronting arms intermediately pivoted to said means at opposed points, a pair of track riding wheels journalled on a common axis at one end of each arm, a clamp shoe on each arm between the respective said wheel and the pivot point, a control shaft rotatable in the other end of one of said arms, means connected to the other ends of said arms to separate the same or move them toward each other to clamp and unclamp said shoes, and a plurality of guiding and anti-tilt wheels carried by said arm spacing means fore and aft of said axis relative to a track and each having a part to extend over the side edge of the track and a part to extend laterally beneath the track so as to prevent tilting and twisting of the assembly.

4. In a track clamp assembly for movement along a track in the nature of the lower flange of an I-beam, arm spacing means, a pair of confronting arms pivoted intermediately to said means, a pair of track riding wheels journalled on a common axis at one end of each arm, rail clamping means on each arm between said wheel and the pivot point, control means to separate and draw towards each other the other ends of said arms to move said shoes to and from clamping position, a plurality of guiding and anti-tilt wheels carried by said arm suporting means fore and aft of said axis relative to a track, means mounting said anti-tilt wheels to provide both lateral and vertical adjustment of said guiding wheels.

5. In a track clamp assembly for movement along a track in the nature of the lower flange of an I-beam, arm spacing means, a pair of confronting arms pivoted intermediately to said means, a track riding wheel at one end of each arm, rail clamping means on each arm between said wheel and the pivot point, control means to separate and draw towards each other the other ends of said arms to move said shoes to and from clamping position, a pair of slide bars carried by said arm spacing means and movable in either direction, an upstanding adjustment bolt carried on one end of one of said bars, a similar bolt carried on the opposite end of the other bar, and a guiding and anti-tilt wheel rotatably mounted on the upper end of each said adjustment bolt.

6. In a track clamp assembly for movement along a track in the nature of the lower flange of an I-beam, arm spacing means, a pair of confronting arms pivoted intermediately to said means, a track riding wheel at one end of each arm, rail clamping means on each arm between said wheel and the pivot point, control means to separate and draw towards each other the other ends of said arms to move said shoes to and from clamping position, horizontally adjustable means carried by said arm spacing means, vertically adjustable means carried by said horizontally adjustable means, and guiding and anti-tilt means on said vertically adjustable means for association with both sides of the track on which the assembly operates.

7. In a track clamp assembly for movement along a track in the nature of the lower flange of an I-beam, a plate having the general shape of a Greek cross, a pair of clamp arms pivoted intermediately to opposed arms of said plate, a track riding wheel on one end of each of said clamp arms, a track clamp shoe on each clamp arm between the respective wheel and pivot point, the other opposed arms of said plate each having a notch therein, a pair of like slide bars in each said notch, a guiding wheel on one end of one slide bar, a guiding wheel on the opposite end of the other slide bar in each notch, means to lock said slide bars in a position of lateral adjustment, means to adjust said guiding wheels vertically, each guiding wheel having a part extending over the side edge of a track and a part extending beneath the track to prevent tilting of the assembly, means connected to pivot said clamp arms to and from clamping position, and a hand wheel and chain to actuate the last said means.

8. In a track clamp assembly for movement along a track in the nature of the lower flange of an I-beam, a plate having the general shape of a Greek cross, a pair of clamp arms pivoted intermediately to opposed arms of said plate, a track riding wheel on one end of each of said clamp arms, a track clamp shoe on each clamp arm between the respective wheel and pivot point, the other opposed arms of said plate each having a notch therein, a pair of like slide bars in each said notch, a guiding wheel on one end of one slide bar, a guiding wheel on the opposite end of the other slide bar in each notch, means to lock said slide bars in a position of lateral adjustment, means to adjust said guiding wheels vertically, each guiding wheel having a part extending over the side edge of a track and a part extending beneath the track to prevent tilting of the assembly, means including anti-friction elements movable in one direction to pivot the clamp arms to released position, a hand wheel and chain to actuate the last said means,
resilient means constantly urging the last said means in the opposite direction to hold said clamp arms in track clamping position, and
a stop member to limit the release movement of the clamp arms to prevent injury to said resilient means.

References Cited by the Examiner

UNITED STATES PATENTS

| | | | |
|---|---|---|---|
| 2,787,969 | 4/1954 | Davis | 188—42 X |
| 3,017,958 | 1/1962 | Richter | 188—43 |

DUANE A. REGER, *Primary Examiner.*